(No Model.)

G. A. MOTT.
VEHICLE AXLE.

No. 289,689. Patented Dec. 4, 1883.

Witnesses:

Inventor:
Geo. A. Mott

N. PETERS. Photo-Lithographer, Washington, D. C.

UNITED STATES PATENT OFFICE.

GEORGE A. MOTT, OF NEW YORK, N. Y., ASSIGNOR TO HENRY BREWSTER, JOHN W. BRITTON, AND CHANNING M. BRITTON, OF SAME PLACE.

VEHICLE-AXLE.

SPECIFICATION forming part of Letters Patent No. 289,689, dated December 4, 1883.

Application filed March 14, 1883. (No model.)

*To all whom it may concern:*

Be it known that I, GEORGE A. MOTT, of the city of New York, in the county and State of New York, have invented a new and useful Improvement in Axles and Axle-Boxes for Vehicles, of which the following is a specification.

My invention relates to what have long been known among axle-manufacturers and coach-builders as the "Collinge" axle and axle-box, which are principally used in heavy coaches. The end portion of such an axle is usually flattened on one side immediately inside the axle nut or nuts, and on such flattened portion is fitted a collet, or slide, or, as it is sometimes termed, a "D-nut," which has a flange bearing against a seat in the end of the axle-box. When in use, the seat on the axle-box presses with considerable force upon the flange of the collet or D-nut, especially when the axle is underset, so as to bring the under spokes of a dished wheel vertical, and consequently the seat in the axle-box and the flange of the collet or slide are worn very rapidly, and the collet or slide must be from time to time renewed, which is expensive and troublesome. The metal contact between the seat in the axle-box and the flange of the collet or slide is also objectionable, because the friction of the rotary axle-box on the non-rotary collet or slide produces a squeaking noise, which is very disagreeable.

The object of my invention is to remedy the above-mentioned defects; and it consists in the combination, with the axle and axle-box, the latter having a seat at its outer end, of a slide, collet, or D-nut, independent of the nuts which secure the box upon the axle, fitted upon the axle and having a cylindric body and a flange, and a leather washer fitting upon the cylindric body of the slide, collet, or D-nut, and interposed between the metallic surfaces formed by the seat on the axle-box and the flange on the slide, collet, or D-nut, whereby rapid wear and squeaking incident to the contact of said flange with said seat or other rotary part are obviated.

Figure 1:
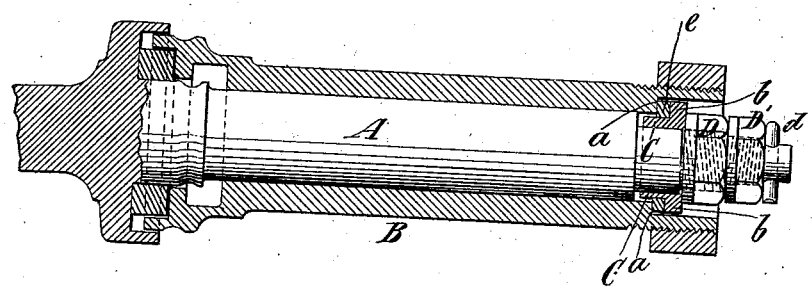
Figure 2:
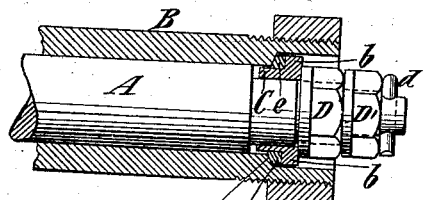
Figure 3:
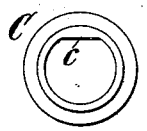

In the accompanying drawings, Figure 1 is a partly-sectional side view of a Collinge axle, and a sectional view of a box embodying my invention. Fig. 2 is a corresponding view of the outer portion of the axle and axle-box, representing a modification of my invention; and Fig. 3 is a plan or end view of the collet or slide detached from other parts.

Similar letters of reference designate corresponding parts in the several figures.

A designates the Collinge axle or axle-arm, and B designates the box fitted thereon. In the outer end of the axle-box is formed a seat, *a*; and C designates a collet, slide, or D-nut provided with a flange, *b*, and fitted to the axle, so as to be held against rotation.

The end portion of the axle is turned down, and such turned-down portion is flattened on one side, so that the collet or slide, which also has a flattened portion, *c*, (see Fig. 3,) will be held thereon against turning, although it may slide longitudinally of the axis. On the outer end of the axle are the usual nuts, D D', fitting reverse threads, so that the outer nut will lock the inner nut and prevent its unscrewing, and outside the nut D' is the usual linchpin, *d*.

Between the seat *a* and the flange *b* of the collet or slide C is placed a removable washer, *e*, which I make of leather, preferably compressed, and the seat and face of the flange may be and preferably are square, as shown in Fig. 1, but may be inclined; or the seat alone may be inclined, as shown in Fig. 2. This washer prevents squeaking, and it will actually wear longer than the metallic surface of the flange *b* in contact with the seat *a*. When the washer wears out, it can be renewed in a very short time and at a trifling cost.

The axle and box, except as above described, are like the ordinary Collinge axles and axle-boxes in extensive use.

What I claim as my invention, and desire to secure by Letters Patent, is—

In a Collinge axle, the combination of the axle A, the axle-box B, having a seat, *a*, at its outer end, the slide, collet, or D-nut C, independent of the nuts which secure the axle-box upon the axle, fitted upon the axle, and having a cylindric body and the flange *b*, and the leather washer *e*, fitted upon the cylindric body of said slide, collet, or D-nut, and interposed between the metallic surfaces formed by the seat *a* and flange *b*, substantially as and for the purpose herein described.

GEO. A. MOTT.

Witnesses:
B. A. MORAN,
C. J. RICHTER.